United States Patent
Gorrle et al.

(10) Patent No.: US 11,294,824 B2
(45) Date of Patent: Apr. 5, 2022

(54) SYSTEM AND METHOD FOR REDUCED LATENCY OF READ-MODIFY-WRITE OPERATIONS

(71) Applicant: WESTERN DIGITAL TECHNOLOGIES, INC., San Jose, CA (US)

(72) Inventors: Dhanunjaya Rao Gorrle, Milpitas, CA (US); Hongmei Xie, Milpitas, CA (US); Hyuk Il Kwon, North San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 173 days.

(21) Appl. No.: 16/733,652

(22) Filed: Jan. 3, 2020

(65) Prior Publication Data

US 2021/0209030 A1 Jul. 8, 2021

(51) Int. Cl.
*G06F 12/10* (2016.01)

(52) U.S. Cl.
CPC ...... *G06F 12/10* (2013.01); *G06F 2212/1024* (2013.01)

(58) Field of Classification Search
CPC ............. G06F 12/1009; G06F 12/1027; G06F 2212/651; G06F 12/10
USPC ................ 711/103, E12.058, 207, 206, 202, 711/E12.059, 205
See application file for complete search history.

(56) References Cited

U.S. PATENT DOCUMENTS

| | | | |
|---|---|---|---|
| 7,944,452 B1 * | 5/2011 | Wietkemper | G06F 12/0223 345/566 |
| 8,924,631 B2 | 12/2014 | Ng et al. | |
| 9,304,709 B2 | 4/2016 | Flinsbaugh et al. | |
| 9,910,599 B2 | 3/2018 | Harada et al. | |
| 10,114,566 B1 | 10/2018 | Chatterjee et al. | |
| 2006/0206687 A1 * | 9/2006 | Vega | G06F 12/10 711/206 |
| 2015/0154112 A1 * | 6/2015 | Tuers | G06F 13/16 714/773 |
| 2017/0160932 A1 * | 6/2017 | Thakkar | G06F 11/1068 |
| 2019/0114255 A1 | 4/2019 | Jain | |
| 2019/0155723 A1 * | 5/2019 | Park | G06F 12/0246 |
| 2019/0163620 A1 | 5/2019 | Muthiah et al. | |
| 2020/0310978 A1 * | 10/2020 | Rodgers | G06F 12/1027 |

* cited by examiner

*Primary Examiner* — Tuan V Thai
*Assistant Examiner* — Edward Waddy, Jr.
(74) *Attorney, Agent, or Firm* — Arent Fox LLP

(57) ABSTRACT

Aspects of a storage device including a memory and a controller are provided which allows for reduced latency of read-modify-write operations when a data length from a host is unaligned at two ends with a write length of the controller. When the controller receives from a host device a write command for data, the controller performs a first read of a head portion and a second read of a tail portion immediately after performing the first read. The controller performs a single L2P translation of one of the head or tail portions, senses the data associated with the head and tail portions once into latches, and reads the data from the latches for both the head and tail portions without performing another data sense. The controller then writes the data in response to the write command after performing the first read and the second read.

15 Claims, 6 Drawing Sheets

SYSTEM AND METHOD FOR REDUCED LATENCY OF READ-MODIFY-WRITE OPERATIONS

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices generally have a minimum length of data which may be read from and written to the flash memory at a single time. For instance, a typical flash storage device may read or write 4 KB of data at one time (e.g. the flash storage has a read length or write length of 4 KB, or a 4 KB unit of controller operation). Thus, when a flash storage device receives a write command for data that is already aligned with the flash storage device's unit of controller operation (e.g. 4 KB of data is received), the flash storage device may simply execute the host command to write the data into memory.

However, when the flash storage device receives a write command for data that is unaligned with the flash storage device's unit of controller operation (for example, data less than 4 KB in the above example), the flash storage device generally performs a read-modify-write (RMW) operation to align the write command with the unit of controller operation prior to writing the data to memory. For example, if the flash storage device receives a write command for 512 bytes of data, the flash storage device may perform RMW by reading approximately 3.5 KB of adjacent data from the memory, modifying the write command to merge the 512 bytes and 3.5 KB into 4 KB of data (e.g. in alignment with the write length), and writing the aligned data to the flash memory.

SUMMARY

One aspect of a storage device is disclosed herein. The storage device includes a memory configured to store data, and a controller. The controller is configured to receive from a host device a write command for the data including one or more requested logical addresses, where a data length associated with the one or more requested logical addresses is unaligned to a write length of the controller. The controller is further configured to perform a first read of the data associated with a head portion including at least one preceding logical address, and a second read of the data associated with a tail portion including at least one following logical address. The controller is further configured to sense the data associated with the head portion and the tail portion from the memory into one or more latches, to read the data from the one or more latches for one of the head portion or the tail portion after sensing the data, and to read the data from the one or more latches for the other of the tail portion or the head portion without performing another sense. The controller is further configured to write the data in response to the write command after performing the first read and the second read.

Another aspect of a storage device is disclosed herein. The storage device includes a memory configured to store data, and a controller. The controller is configured to receive from a host device a write command for the data including one or more requested logical addresses, where a data length associated with the one or more requested logical addresses is unaligned to a write length of the controller. The controller is further configured to perform a first read of the data associated with a head portion including at least one preceding logical address, and a second read of the data associated with a tail portion including at least one following logical address. The controller is further configured to perform one of the first read or the second read immediately after performing the other of the first read or the second read, and to write the data in response to the write command after performing the first read and the second read.

A further aspect of a storage device is disclosed herein. The storage device includes a memory configured to store data, and a controller. The controller is configured to receive from a host device a write command for the data including one or more requested logical addresses, where a data length associated with the one or more requested logical addresses is unaligned to a write length of the controller. The controller is further configured to perform a first read of the data associated with a head portion including at least one preceding logical address, and a second read of the data associated with a tail portion including at least one following logical address. The controller is further configured to perform a logical-to-physical (L2P) translation of one of the head portion or the tail portion to a first physical address, and to identify a second physical address for the other of the head portion or the tail portion based on the first physical address without performing another L2P translation. The controller is further configured to write the data in response to the write command after performing the first read and the second read.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
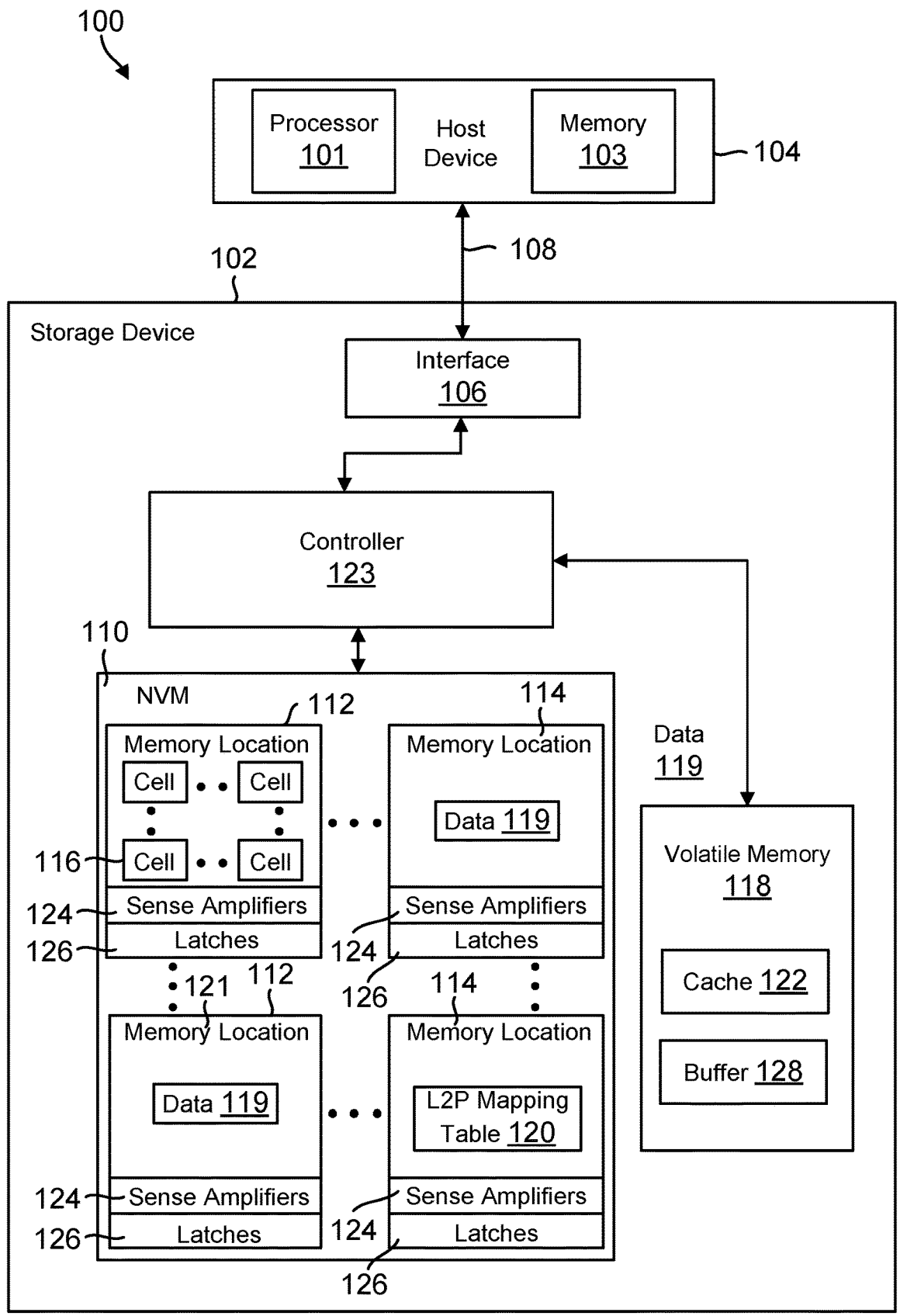
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device receives a write command including a range of logical addresses associated with data (e.g. including 512 bytes of data) which is unaligned to the unit of controller operation (e.g. a write length of 4 KB), the storage device may perform RMW. For instance, the storage device may perform RMW when a host device is requesting to modify only a small fragment of data in the memory of the storage device. Such unalignment may be common in enterprise SSDs or other high capacity storage devices, where the controller of the storage device typically operates in larger logical address ranges (e.g. spanning 16 KB of data, 64 KB of data, etc.) in order to efficiently manage logical-to-physical address mappings of data stored in larger memories. For purposes of this disclosure, the storage device described herein will be assumed to have a 4 KB unit of controller operation or write length, although it should be appreciated that the storage device may have other write lengths (e.g. 16 KB, 64 KB, etc.).

Unalignment may occur when the logical address received in a write command from the host device is at the beginning, end, or middle of the range of logical addresses associated with controller unit operation. For example, 4 KB of data may be associated with a range of eight logical addresses (e.g. logical block addresses (LBA) 0-7), where each LBA may be associated with 512 bytes of data. In such case, if the logical address(es) specified in the write command is in the beginning of the range (e.g. one or more of LBAs 0-6 in the above example), at the end of the range (e.g. one or more of LBAs 1-7 in the above example), or in the middle of the range (e.g. one or more of LBAs 1-6 in the above example), the length of the data in the write command may be unaligned with the write length of the controller.

Figure 3:
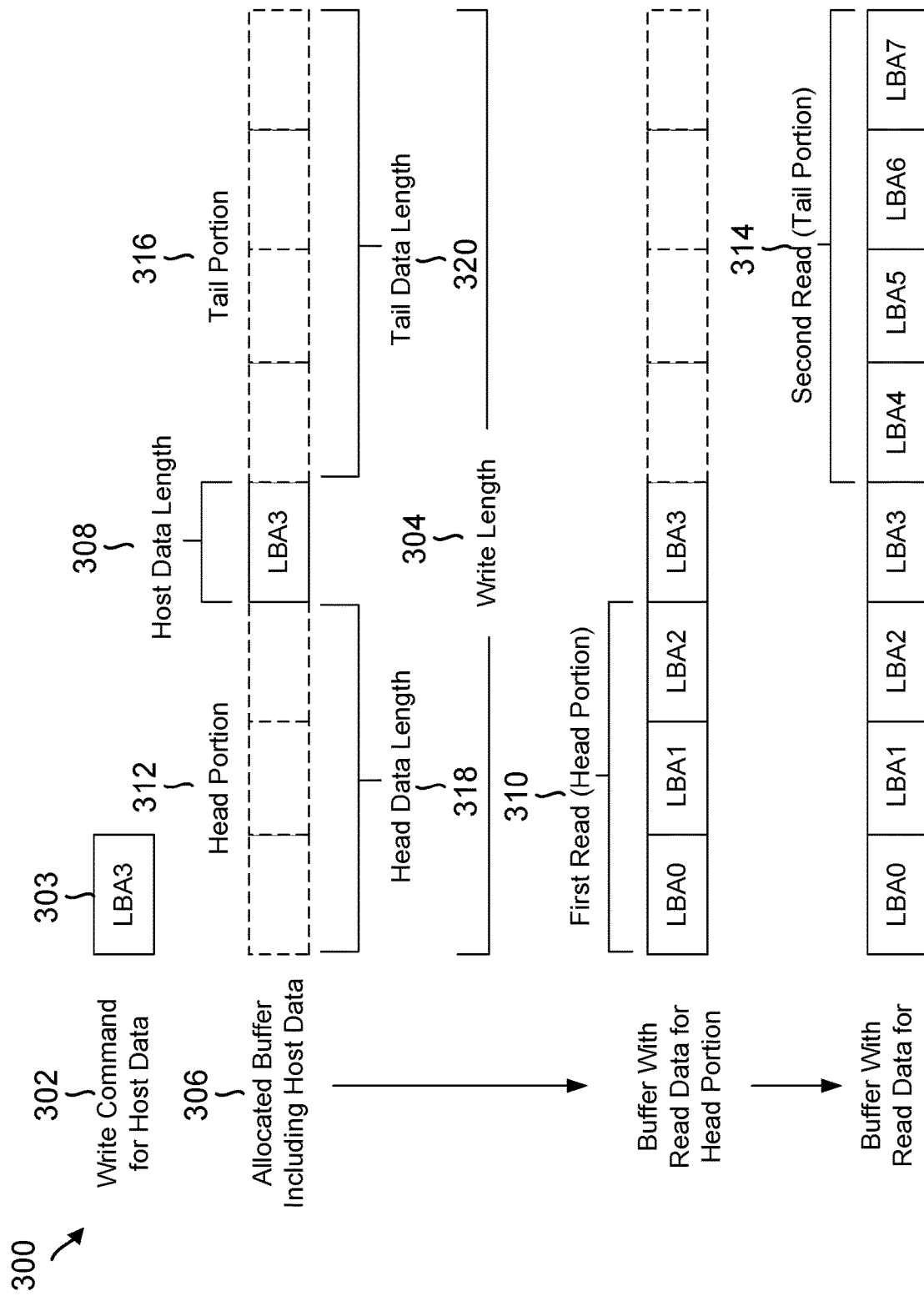
FIG. 3 is a conceptual diagram illustrating an example of RMW.

As a result, the storage device performs RMW to align the lengths by reading the unaligned portion(s) (e.g. a head portion and/or tail portion of the range) from the memory, modifying the write command to include the logical addresses of the unaligned portion(s) (e.g. merging with the head portion and/or tail portion), and then writing to the merged logical addresses. Thus, in the above example, if the logical address specified in the write command is LBA 3 (e.g. middle of the LBA 0-7 range), the storage device performs RMW by reading the head portion (e.g. corresponding to LBAs 0-2) and tail portion (e.g. corresponding to LBAs 4-7) from the memory and by modifying the write command to include these two portions and perform the 4 KB write operation (e.g. at LBAs 0-7). An example of this process is illustrated in FIG. 3, described infra.

When the storage device performs an ordinary write command (without RMW), the controller generally allocates a buffer in volatile memory (e.g. RAM) to temporarily store the data received from the host device before writing the data to memory. The buffer generally is sized to have a length equal to that of the write length of the controller (e.g. the controller operation unit of 4 KB). However, when the storage device performs RMW, the controller may not be able to allocate a separate buffer for the head portion and the tail portion read from the memory due to limited space in the volatile memory. As a result, the controller generally merges the unaligned data (e.g. the head portion and the tail portion) in-place with the host data (e.g. using the same buffer) when performing RMW. This process is also described with respect to FIG. 3, discussed below.

Since the controller of the storage device generally stores the host data in the buffer, the storage device cannot read the entire 4 KB of data at once (e.g. LBAs 0-7) when obtaining the head portion and the tail portion during RMW without overwriting the host data currently in the buffer. Therefore, the controller generally executes a read request for the head portion and/or tail portion, rather than the entire range of logical addresses (e.g. LBAs 0-7), from the memory. When the logical address specified in the write command is in the beginning (e.g. LBA 0) or end (e.g. LBA 7) of the range, only one read request is sent and one L2P mapping translation is performed for either the tail portion (e.g. LBAs 1-7) or head portion (e.g. LBAs 0-6), respectively. However, when the logical address specified in the write command is in the middle of the range (e.g. LBA 3), two separate read requests are sent to the same physical location in NAND, and two separate but identical L2P mapping translations are performed, for the head portion (e.g. LBAs 0-2) and tail portion (e.g. LBAs 4-7). An example of this process is described below with respect to FIG. 4. Thus, additional latency may be imposed for RMWs requiring both head and tail portions.

To reduce this additional latency for such middle of the range write commands, the present disclosure issues internal read requests for the head and tail portions respectively during RMW in an immediate, back-to-back manner. Since the two read requests are encompassed under the same range of logical addresses for controller unit operation (e.g. LBAs 0-7 in the example above), and thus may be mapped to the same physical address, the controller of the storage device may perform a single L2P mapping translation to serve both read requests. The controller may then perform a single sense of the data stored at the identified physical address into latches (e.g. the base data corresponding to LBAs 0-7), from which the head portion (e.g. the data corresponding to LBAs 0-2) and the tail portion (e.g. the data corresponding to LBAs 4-7) may be separately transferred to the controller and merged into the buffer in volatile memory. As a result, the present disclosure allows for the storage device to perform RMW for middle of the range write commands with reduced latency by allowing the storage device to only perform a single L2P mapping translation and a single NAND read for both the head portion and the tail portion. An example of this process is illustrated below with respect to FIG. 5.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be SLCs, MLCs, TLCs, QLCs, and/or PLCs, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer 128 (e.g. a write buffer or a read buffer) for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
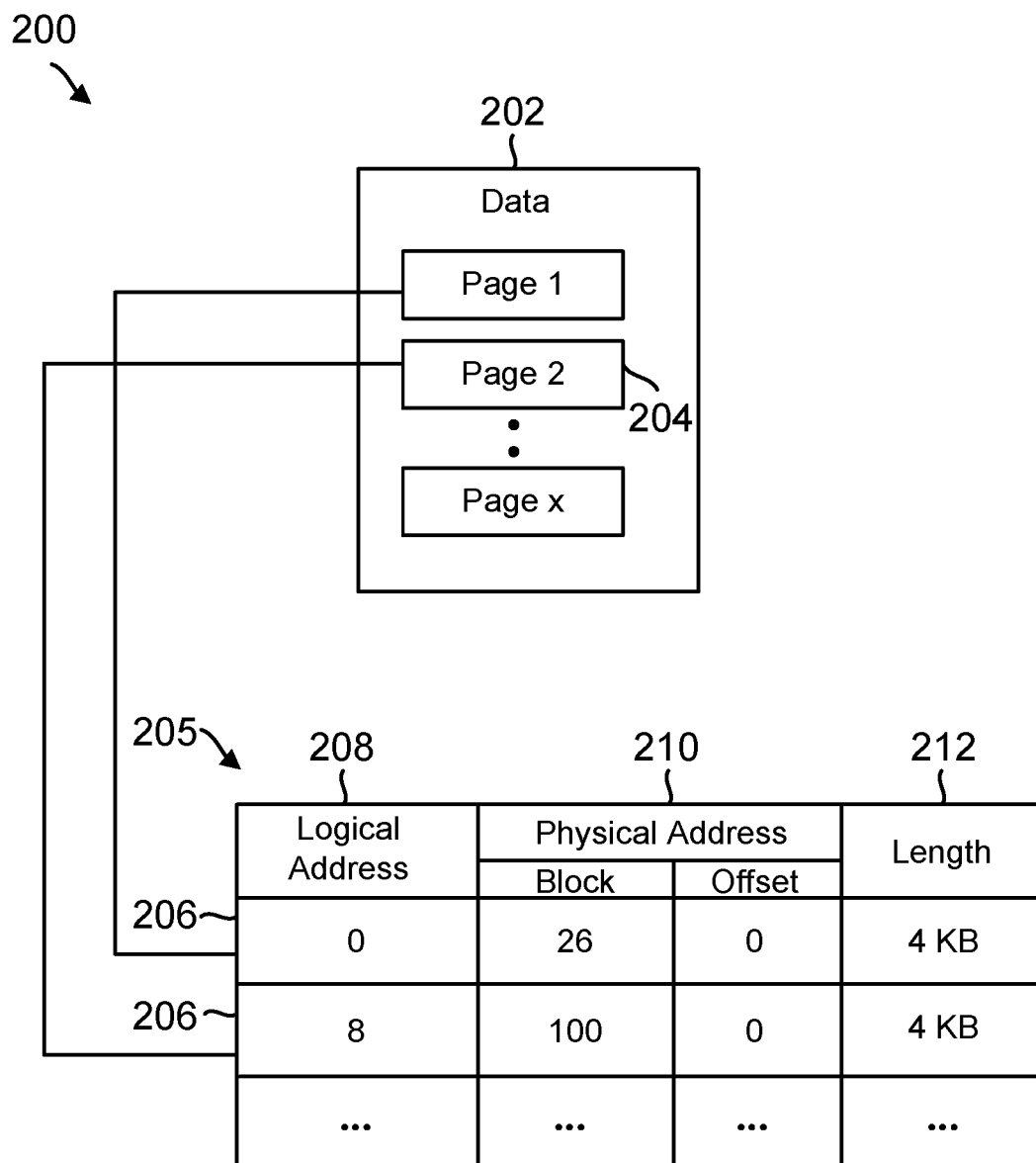
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 may be further configured to access the memory locations 112 in parallel. For example the memory locations 112 may be blocks 114 stored on different dies of the NVM 110, and each die may be connected to the controller 123 by its own data bus. The controller may read or write data to the cells 116 on the different dies simultaneously over the multiple data buses. Additionally, the controller 123 may be configured to refrain from accessing the memory locations 112 in parallel, and may instead access the memory locations 112 serially. For example, the controller may determine to read or write data to the cells 116 of a memory location 112 in sequence rather than simultaneously over the multiple data buses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

When the storage device 102 receives a write command from the host device 104, the storage device may perform a RMW operation. FIG. 3 illustrates an example 300 of a RMW operation performed by a storage device in response to a write command 302 received from a host device. The storage device may correspond to storage device 102 of FIG. 1, and the host device may correspond to host device 104 of FIG. 1. In this example, the write command 302 includes 512 bytes of host data associated with a logical address 303 in the middle of the range of controller unit operation (e.g. LBA 3). Moreover, the example of FIG. 3 assumes that the controller of the storage device has a write length 304 of 4 KB spanning eight logical addresses (e.g. LBAs 0-7), although the write length is not limited to such arrangement as described above.

When the controller (e.g. controller 123 of FIG. 1) receives the write command 302, the controller allocates a buffer 306 in the volatile memory (e.g. buffer 128) having a length equal to write length 304 for temporarily storing the host data. Since the host data has a data length 308 which is different than (e.g. unaligned with) write length 304, the storage device proceeds to align the data prior to executing write command 302. For example, the controller performs a first read 310 of a head portion 312 (e.g. the data associated with LBA 0-2) from the NVM 110 and merges the head portion in place with the host data in the respective location of the buffer, and the controller subsequently performs a second read 314 of a tail portion 316 (e.g. the data associated with LBA 4-7) from the NVM 110 and merges the tail portion in place with the host data in the respective location of the buffer. In this example, the head portion 312 has a head data length 318 spanning three logical addresses, and the tail portion 316 has a tail data length 320 spanning four logical addresses, although the lengths of the head and tail portions may be different depending on the location of the host data so long as the sum of host data length 308, head data length 318, and tail data length 320 is equal to the write length 304. Once the host data is aligned in this manner, the controller writes the entire data in buffer 306 to the NVM 110 to complete the RMW operation.

Figure 4:
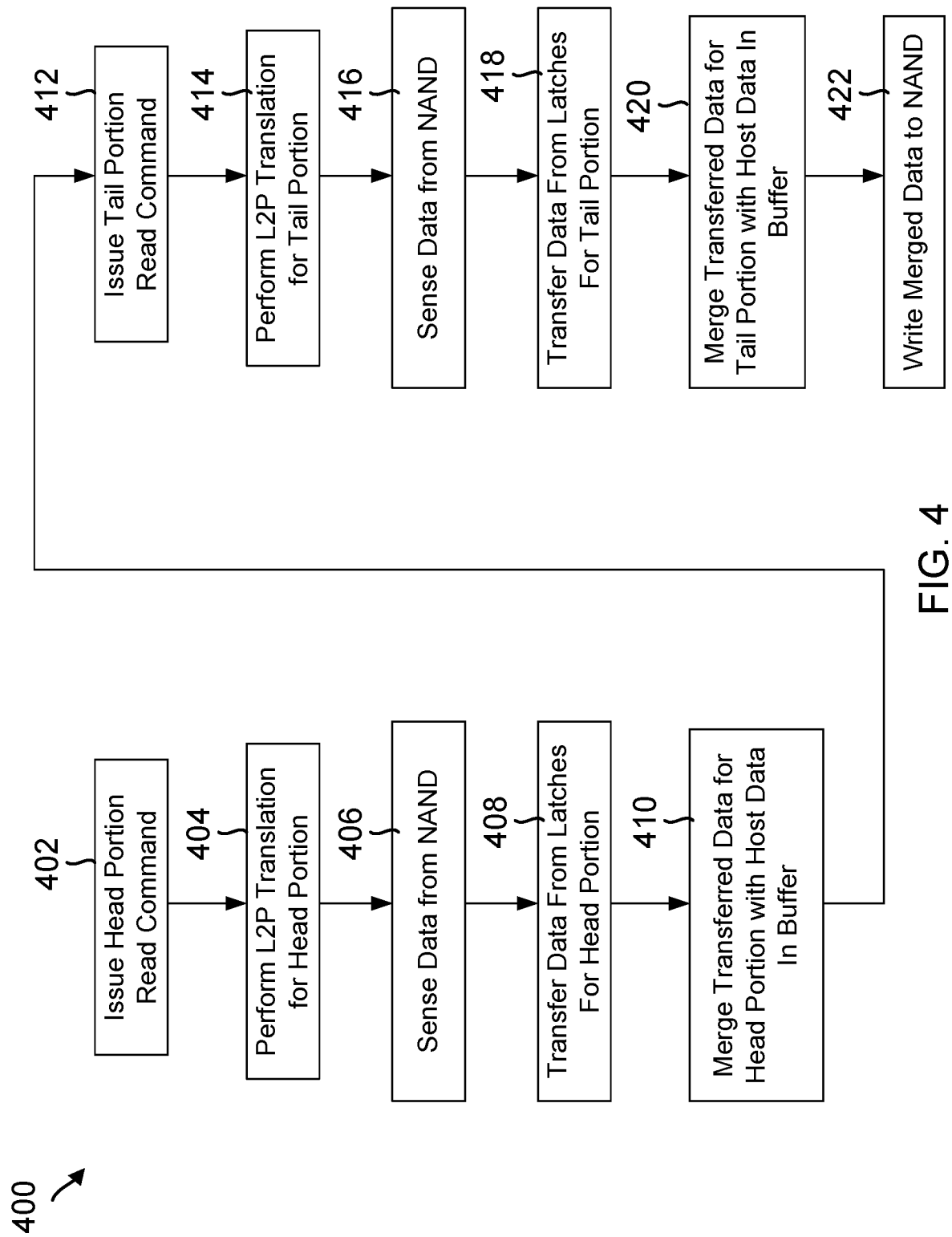
FIG. 4 is a flow chart illustrating an exemplary method for performing RMW by the storage device of FIG. 1.

FIG. 4 illustrates an example flow chart 400 of a method of RMW operation in which the head portion and tail portion are read from the NVM 110 independently. The various steps described in the flow chart 400 may occur after a controller of the storage device receives a write command including a requested logical address for host data (e.g. LBA 3). Moreover, the operations described in the flow chart 400 assume a write length of 4 KB (e.g. corresponding to 8 LBAs), although other write lengths may be used based on the storage device as described above.

As represented by block 402, after receiving the write command (e.g. including LBA 3), a controller of the storage device may issue a read command for a head portion (e.g. head portion 312). For example, referring to FIG. 3, the controller may initially read data associated with LBAs 0-2, which are the preceding logical addresses in the 4 KB logical address range for the host data to be written (e.g. LBAs 0-7).

Accordingly, as represented by block 404, the controller may perform a L2P translation for the head portion. The controller may, for instance, set up translation request parameters for the head portion (e.g. creating a field in volatile memory to store the identified physical address) and issue a translation request to the L2P mapping table 120 to access and translate the first logical address in the 4 KB logical address range for the host data. For example, referring to FIG. 2, the controller may identify the physical address 210 associated with the logical address 208 corresponding to the first logical address in the 4 KB logical address range (e.g. LBA 0) as PBA 26. The controller may then store the identified physical address 210 in the created field in volatile memory.

Afterwards, as represented by block 406, the controller senses the data in the 4 KB logical address range from the NAND (e.g. NVM 110) at the identified physical address. For example, referring to FIG. 1, the controller may activate the sense amplifiers 124 to perform a data read from cells 116 in the memory locations 112 corresponding to PBA 26 into latches 126. For instance, the sense amplifiers 124 may sense eight bits (corresponding to one bit for each of LBA 0-7) into latches 126.

Subsequently, as represented by block 408, the controller may transfer the sensed data from the latches for the head portion. For example, the data 119 associated only with LBAs 0-2 may be transferred from latches 126 to the controller 123.

Then, as represented by block 410, the controller merges the transferred data for the head portion in a buffer allocated to the write command for the host data. For example, once the head portion (e.g. the data associated with LBAs 0-2) is transferred to the controller 123, the controller merges the head portion with the host data (corresponding to LBA 3) previously stored in the buffer 128 in the volatile memory 118. The controller may then repeat the aforementioned process independently for the tail portion as described immediately below.

As represented by block 412, after completing the read of the head portion, the controller of the storage device may issue a read command for the tail portion (e.g. tail portion 316). For example, referring to FIG. 3, the controller may read data associated with LBAs 4-7, which are the following logical addresses in the 4 KB logical address range for the host data to be written (e.g. LBAs 0-7).

Accordingly, as represented by block 414, the controller may perform a L2P translation for the tail portion. The controller may, for instance, set up translation request parameters for the tail portion (e.g. creating a field in volatile memory to store the identified physical address) and issue another translation request to the L2P mapping table 120 to access and translate the first logical address in the 4 KB logical address range for the host data. For example, referring to FIG. 2, the controller may repeat the operation of block 404 by again identifying the physical address 210 associated with the logical address 208 corresponding to the first logical address in the 4 KB logical address range (e.g. LBA 0), which as illustrated in this example, again may be PBA 26. The controller may then store the identified physical address 210 in the created field in volatile memory.

Afterwards, as represented by block 416, the controller senses the data in the 4 KB logical address range from the NAND (e.g. NVM 110) at the identified physical address. For example, referring to FIG. 1, the controller may repeat the operation of block 406 by again activating the sense amplifiers 124 to perform a data read from cells 116 in the memory locations 112 corresponding to PBA 26 into latches 126. For instance, the sense amplifiers 124 may again sense eight bits (corresponding to one bit for each of LBA 0-7) into latches 126.

Subsequently, as represented by block 418, the controller may transfer the sensed data from the latches for the tail portion. For example, the data 119 associated only with LBAs 4-7 may be transferred from latches 126 to the controller 123.

Next, as represented by block 420, the controller merges the transferred data for the tail portion with the host data in the buffer. For example, once the tail portion (e.g. the data associated with LBAs 4-7) is transferred to the controller 123, the controller merges the tail portion with the host data and head portion previously stored in the buffer 128 in the volatile memory 118.

Finally, as represented by block 422, the controller writes the merged data (e.g. the buffer 128) to the memory. For instance, the controller may write all 4 KB of aligned data (e.g. the head portion, the host data, and the tail portion) to the NVM 110 to complete operation of RMW.

However, as described above, the RMW example of FIG. 4 may require duplicate operations (e.g. blocks 404, 414 and 406, 416) to be performed when reading the head portion and the tail portion, since two identical L2P mapping translations (e.g. to identify PBA 26) and two identical NAND senses (e.g. 4 KB of data in LBAs 0-7) are performed. This duplicate operation may cause unnecessary latency to be added to the RMW operation when both a head portion and tail portion are being read in response to unaligned host data associated with an intermediate logical address within the write length.

Figure 5:
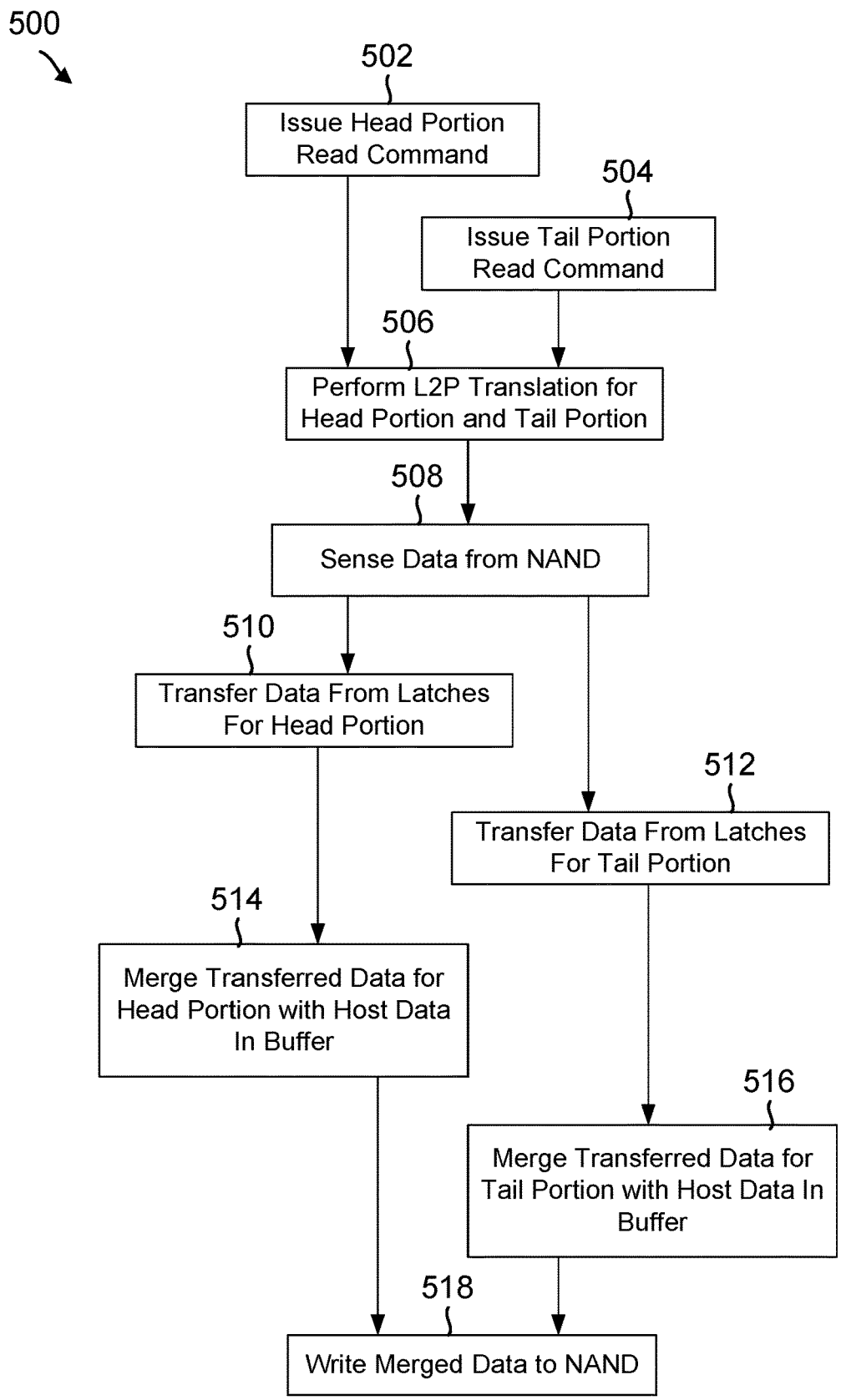
FIG. 5 is a flow chart illustrating another exemplary method for performing RMW by the storage device of FIG. 1.

To reduce this additional latency from duplicate operation, the controller may issue the read command for the tail portion immediately after issuing the read command for the head portion (or vice-versa). FIG. 5 illustrates an example flow chart 500 of a method of performing RMW in which the tail portion is immediately read from the NVM 110 after the head portion. For example, the method can be carried out in a storage device 102 such as the one illustrated in FIG. 1. Each of the steps in the flow chart can be controlled using the controller as described below (e.g. controller 123), or by some other suitable means.

The various steps described in the flow chart 500 may occur after a controller of the storage device receives a write command including a requested logical address for host data (e.g. LBA 3). Moreover, the operations described in the flow chart 400 assume a write length of 4 KB (corresponding to 8 LBAs), although other write lengths may be used based on the storage device as described above. Additionally, while FIG. 5 illustrates the example where the tail portion read occurs immediately after the head portion read, the reverse is also possible; the head portion read may occur immediately after the tail portion read.

As represented by block 502, after receiving the write command (e.g. including LBA 3), a controller of the storage device issues a read command for a head portion (e.g. head portion 312). For example, referring to FIG. 3, the controller may initially read data associated with LBAs 0-2, which are the preceding logical addresses in the 4 KB logical address range for the host data to be written (e.g. LBAs 0-7).

As represented by block 504, immediately after issuing the read command for the head portion (e.g. without waiting for the head portion read to be completed as in FIG. 4), the controller of the storage device issues a read command for the tail portion. For example, referring to FIG. 3, the controller may read data associated with LBAs 4-7, which are the following logical addresses in the 4 KB logical address range for the host data to be written (e.g. LBAs 0-7).

Accordingly, as represented by block 506, the controller performs a single L2P translation for the head portion and the tail portion. The controller may, for instance, set up translation request parameters for the head portion and the tail portion (e.g. creating fields in volatile memory to store the identified physical address) and issue a translation request to the L2P mapping table 120 to access and translate the first logical address in the 4 KB logical address range for the host data. For example, referring to FIG. 2, the controller may identify the physical address 210 associated with the logical address 208 corresponding to the first logical address in the 4 KB logical address range (e.g. LBA 0) as PBA 26. The controller may then store the identified physical address 210 in the created fields in volatile memory for both the head portion and the tail portion.

However, unlike the example of FIG. 4, the controller may perform only a single translation by identifying the physical address for the associated logical address range when executing the first read (e.g. the head portion read), and then storing the identified physical address in the volatile memory for use when executing the second read (e.g. the tail portion read). This operation is possible since the second read immediately follows the first read as described above (e.g. before completion of the first read), and thus the translation request for the first read may serve the second read. Moreover, the physical addresses associated with the first read and the second read are expected to be identical since they both correspond to the same 4 KB-aligned logical address range. In contrast, where the second read occurs after the first read is completed as in the example of FIG. 4, an additional translation request will need to be sent to accomplish the second read, which adds unnecessary delay that may be avoided in the example of FIG. 5.

Afterwards, as represented by block 508, the controller senses the data in the 4 KB logical address range from the NAND (e.g. NVM 110) at the identified physical address. For example, referring to FIG. 1, the controller may activate the sense amplifiers 124 to perform a data read from cells 116 in the memory locations 112 corresponding to PBA 26 into latches 126. For instance, the sense amplifiers 124 may sense eight bits (corresponding to one bit for each of LBA 0-7) into latches 126.

However, unlike the example of FIG. 4, in this example the controller performs only a single NAND sense to read the data into the latches 126 when executing the first read (e.g. the head portion read), while reading the data already in the latches when executing the second read (e.g. the tail portion read). This arrangement is possible since the second read immediately follows the first read as described above, and thus the likelihood of an intervening read command to another physical address which may overwrite the data in the latches 126 is significantly reduced. In contrast, where the second read occurs after the first read is completed as in the example of FIG. 4, an intervening read command for a different physical address may occur in the time between the two reads, which would require sensing of new data and overwriting of the data stored in the latches during execution of the first read. As a result, a second sense would be required for execution of the second read, adding unnecessary delay which may be avoided in the example of FIG. 5.

Subsequently, as represented by block 510, the controller may transfer the sensed data from the latches for the head portion (e.g. from execution of the first read). For example, the data 119 associated only with LBAs 0-2 may be transferred from latches 126 to the controller 123. Similarly, as represented by block 512, the controller may transfer the sensed data from the latches for the tail portion (e.g. from execution of the second read). For example, the data 119 associated only with LBAs 4-7 may be transferred from latches 126 to the controller 123.

Then, as represented by block 514, the controller merges the transferred data for the head portion in a buffer allocated to the write command for the host data. For example, once the head portion (e.g. the data associated with LBAs 0-2) is transferred to the controller 123, the controller merges the head portion with the host data (corresponding to LBA 3) previously stored in the buffer 128 in the volatile memory 118. Similarly, as represented by block 516, the controller merges the transferred data for the tail portion with the host data in the buffer. For example, once the tail portion (e.g. the data associated with LBAs 4-7) is transferred to the controller 123, the controller merges the tail portion with the host data and head portion previously stored in the buffer 128 in the volatile memory 118.

Finally, as represented by block 518, the controller writes the merged data (e.g. the buffer 128) to the memory. For instance, the controller may write all 4 KB of aligned data (e.g. the head portion, the host data, and the tail portion) to the NVM 110 to complete operation of RMW. As a result, the RMW operation as illustrated in the example of FIG. 5 may reduce input/output latency by allowing the head portion read and the tail portion read to occur in a back-to-back manner, rather than after each read is completed as in the example of FIG. 4.

Figure 6:
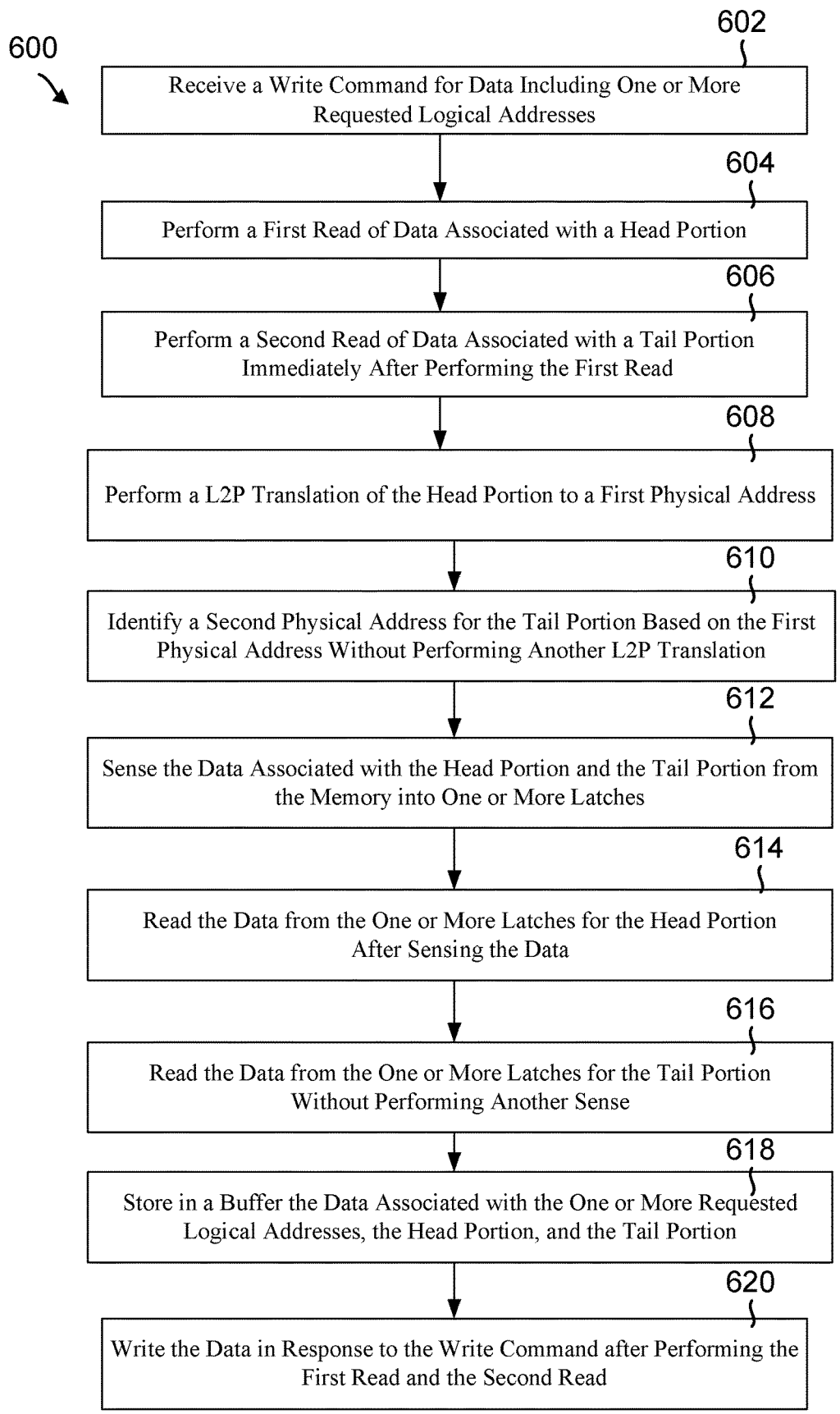
FIG. 6 is a flow chart illustrating another exemplary method for performing RMW by the storage device of FIG. 1.

FIG. 6 illustrates an example flow chart 600 of a method for performing RMW. For example, the method can be carried out in a storage device 102 such as the one illustrated in FIG. 1. Each of the steps in the flow chart can be controlled using the controller as described below (e.g. controller 123), or by some other suitable means. While FIG. 6 illustrates the tail portion read occurring after the head portion read, the method is not limited to this order; for example, the head portion read may occur after the tail portion read.

As represented by block 602, the controller receives from a host device a write command for the data including one or more requested logical addresses. A data length associated with the one or more requested logical addresses may be unaligned to a write length of the controller. For example, referring to FIGS. 1-5, a controller 123 of the storage device 102 may receive a write command 302 including a requested logical address 303 (e.g. LBA 3) for data 119 from the host device 104. The host data may have a data length 308 which is different than (e.g. unaligned with) write length 304 of the controller 123.

As represented by block 604, the controller performs a first read of data associated with a head portion including at least one preceding logical address, and as represented by block 606, the controller performs a second read of data associated with a tail portion including at least one following logical address. The controller may perform one of the first read or the second read immediately after performing the other of the first read or the second read. For example, referring to FIGS. 1, 3 and 5, the controller may perform a first read 310 of a head portion 312 (e.g. the data associated with LBA 0-2) from the NVM 110, and a second read 314 of a tail portion 316 (e.g. the data associated with LBA 4-7) from the NVM 110. For instance, as represented by block 502, after receiving a write command including a requested logical address for host data (e.g. LBA 3), the controller may read data associated with LBAs 0-2, which are the preceding logical addresses in the 4 KB logical address range for the host data to be written (e.g. LBAs 0-7). Similarly, as represented by block 504, immediately after issuing the read command for the head portion (e.g. without waiting for the head portion read to be completed), the controller may read data associated with LBAs 4-7, which are the following logical addresses in the 4 KB logical address range for the host data to be written (e.g. LBAs 0-7).

The write length of the controller may be a sum of the data length associated with the one or more requested logical addresses and the data length of the head portion and the tail portion. For example, the head portion 312 may have a head data length 318 spanning three logical addresses, and the tail portion 316 may have a tail data length 320 spanning four logical addresses, although the lengths of the head and tail portions may be different depending on the location of the host data so long as the sum of host data length 308, head data length 318, and tail data length 320 is equal to the write length 304.

As represented by block 608, the controller performs a L2P translation of one of the head portion or the tail portion to a first physical address. For example, referring to FIG. 5, as represented by block 506, the controller may perform a single L2P translation for the head portion and the tail portion. The controller may, for instance, set up translation request parameters for the head portion and the tail portion (e.g. creating fields in volatile memory to store the identified physical address) and issue a translation request to the L2P mapping table 120 to access and translate the first logical address in the 4 KB logical address range for the host data. For example, referring to FIG. 2, the controller may identify the physical address 210 associated with the logical address 208 corresponding to the first logical address in the 4 KB logical address range (e.g. LBA 0) as PBA 26. The controller may then store the identified physical address 210 in the created fields in volatile memory for both the head portion and the tail portion.

As represented by block 610, the controller identifies a second physical address for the other of the head portion or the tail portion based on the first physical address without performing another L2P translation. The head portion and the tail portion may be mapped to an identical physical address. For example, referring to FIG. 5, the controller may perform only a single translation by identifying the physical address for the associated logical address range when executing the first read (e.g. the head portion read), and then storing the identified physical address in the volatile memory for use when executing the second read (e.g. the tail portion read). The physical addresses associated with the first read and the second read are expected to be identical since they both correspond to the same 4 KB-aligned logical address range. Thus, if the controller identifies the physical address 210 associated with the first read to be PBA 26 as described above, the controller may determine that the physical address associated with the second read is also PBA 26.

As represented by block 612, the controller senses the data associated with the head portion and the tail portion from the memory into one or more latches. For example, referring to FIG. 5, as represented by block 508, the controller may sense the data in the 4 KB logical address range from the NAND (e.g. NVM 110) at the identified physical address. For example, referring to FIG. 1, the controller may activate the sense amplifiers 124 to perform a data read from cells 116 in the memory locations 112 corresponding to PBA 26 into latches 126.

As represented by block 614, the controller reads the data from the one or more latches for one of the head portion or the tail portion after sensing the data. For example, referring to FIG. 5, as represented by block 510, the controller may transfer the sensed data from the latches for the head portion (e.g. from execution of the first read). For example, the data 119 associated only with LBAs 0-2 may be transferred from latches 126 to the controller 123.

As represented by block 616, the controller reads the data from the one or more latches for the other of the tail portion or the head portion without performing another sense. For example, referring to FIG. 5, where the second read immediately follows the first read as described above, the controller may perform only a single NAND sense to read the data into the latches 126 when executing the first read (e.g. the head portion read), while reading the data already in the latches when executing the second read (e.g. the tail portion read). Thus, as represented by block 512, the controller may transfer the sensed data from the latches for the tail portion (e.g. from execution of the second read). For example, the data 119 associated only with LBAs 4-7 may be transferred from latches 126 to the controller 123.

As represented by block 618, the controller stores in a buffer the data associated with the one or more requested logical addresses, the data associated with the head portion after performing the first read, and the data associated with the tail portion after performing the second read. The buffer spans the write length of the controller. For example, referring to FIG. 3, when the controller receives the write command 302, the controller allocates a buffer 306 in the volatile memory (e.g. buffer 128) having a length equal to write length 304 for temporarily storing the host data. Since the host data has a data length 308 which is different than (e.g. unaligned with) write length 304, the storage device proceeds to align the data prior to executing write command 302. For example, referring to FIG. 5, as represented by block 514, the controller merges the transferred data for the head portion in the buffer allocated to the write command for the host data, and as represented by block 516, the controller merges the transferred data for the tail portion with the host data in the buffer.

Finally, as represented by block 620, the controller writes the data in response to the write command after performing the first read and the second read. The controller may write the data associated with the one or more requested logical addresses, the head portion, and the tail portion to the memory in response to the write command. For example, referring to FIG. 5, as represented by block 518, the controller may write the merged data (e.g. the buffer 128) to the memory. For instance, the controller may write all 4 KB of aligned data (e.g. the head portion, the host data, and the tail portion) to the NVM 110 to complete operation of RMW.

Accordingly, the present disclosure improves the RMW operation by reducing the number of L2P translations and NAND reads (sense) for host write commands with two-end unalignment (e.g. intermediate or middle of the range logical addresses within the write length). For example, the present disclosure allows for the controller of the storage device to perform only one L2P translation and 4 KB aligned data sense from the NVM, and thus faster transfer of head portions and tail portions, in contrast to RMW implementations which may perform two L2P translations and data senses for head and tail portions.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   memory; and
   a controller configured to receive from a host device a write command including one or more requested logical addresses for host data, wherein a data length associated with the one or more requested logical addresses is unaligned to a write length of the controller;
   wherein the controller is further configured to issue a first read command for a head portion associated with at least one preceding logical address to the one or more requested logical addresses, and to issue a second read command for a tail portion associated with at least one following logical address to the one or more requested logical addresses; and
   wherein the controller is configured to sense data associated with the one or more requested logical addresses, the at least one preceding logical address, and the at least one following logical address from the memory into one or more latches, to read the head portion from the one or more latches after sensing the data, and to read the tail portion from the one or more latches without performing another sense;

wherein the controller is configured to write the host data in response to the write command after the head portion is read in response to the first read command and the tail portion is read in response to the second read command;

wherein the controller is configured to identify a first physical address for the head portion in response to a logical-to-physical (L2P) translation, and to identify a second physical address for the tail portion without performing another L2P translation; and wherein the head portion and the tail portion are associated with an identical physical address.

2. The storage device of claim 1, wherein the write length of the controller is a sum of the data length of the host data, a head data length of the head portion, and a tail data length of the tail portion.

3. The storage device of claim 1, wherein the memory includes a buffer spanning the write length of the controller, and the controller is further configured to store in the buffer the host data, the head portion after the head portion is read, and the tail portion after the tail portion is read.

4. The storage device of claim 1, wherein the controller is further configured to write the host data, the head portion, and the tail portion to the memory in response to the write command.

5. A storage device, comprising:

memory; and a controller configured to receive from a host device a write command including one or more requested logical addresses for host data, wherein a data length associated with the one or more requested logical addresses is unaligned to a write length of the controller;

wherein the controller is further configured to issue a first read command for a head portion associated with at least one preceding logical address to the one or more requested logical addresses, and to issue a second read command for a tail portion associated with at least one following logical address to the one or more requested logical addresses;

wherein the controller is further configured to:

issue the first read command for the head portion immediately after issuing the second read command for the tail portion, or issue the second read command for the tail portion immediately after issuing the first read command for the head portion, and wherein the controller is further configured to write the host data in response to the write command after the head portion is read in response to the first read command and the tail portion is read in response to the second read command;

wherein the controller is further configured to identify a first physical address for the head portion in response to a logical-to-physical (L2P) translation, and to identify a second physical address for the tail portion without performing another L2P translation;

wherein the head portion and the tail portion are associated with an identical physical address.

6. The storage device of claim 5, wherein the controller is configured to sense data associated with the one or more requested logical addresses, the at least one preceding logical address, and the at least one following logical address from the memory into one or more latches, to read the head portion from the one or more latches after sensing the data, and to read the tail portion from the one or more latches without performing another sense.

7. The storage device of claim 5, wherein the write length of the controller is a sum of the data length of the host data, a head data length of the head portion, and a tail data length of the tail portion.

8. The storage device of claim 5, wherein the memory includes a buffer spanning the write length of the controller, and the controller is further configured to store in the buffer the host data, the head portion after the head portion is read, and the tail portion after the tail portion is read.

9. The storage device of claim 5, wherein the controller is further configured to write the host data, the head portion, and the tail portion to the memory in response to the write command.

10. A storage device, comprising:

memory; and a controller configured to receive from a host device a write command including one or more requested logical addresses for host data, wherein a data length associated with the one or more requested logical addresses is unaligned to a write length of the controller;

wherein the controller is further configured to issue a first read command for a head portion associated with at least one preceding logical address to the one or more requested logical addresses, and to issue a second read command for a tail portion associated with at least one following logical address to the one or more requested logical addresses, the controller being further configured to write the host data in response to the write command after the head portion is read in response to the first read command and the tail portion is read in response to the second read command; and wherein the controller is further configured to identify a first physical address for the head portion in response to a logical-to-physical (L2P) translation, and to identify a second physical address for the tail portion without performing another L2P translation;

wherein the head portion and the tail portion are associated with an identical physical address.

11. The storage device of claim 10, wherein the controller is further configured to:

issue the first read command for the head portion immediately after issuing the second read command for the tail portion, or issue the second read command for the tail portion immediately after issuing the first read command for the head portion.

12. The storage device of claim 10, wherein the controller is configured to sense data associated with the one or more requested logical addresses, the at least one preceding logical address, and the at least one following logical address from the memory into one or more latches, to read the head portion from the one or more latches after sensing the data, and to read the tail portion from the one or more latches without performing another sense.

13. The storage device of claim 10, wherein the write length of the controller is a sum of the data length of the host data, a head data length of the head portion, and a tail data length of the tail portion.

14. The storage device of claim 10, wherein the memory includes a buffer spanning the write length of the controller, and the controller is further configured to store in the buffer the host data, the head portion after the head portion is read, and the tail portion after the tail portion is read.

15. The storage device of claim 10, wherein the controller is further configured to write the host data, the head portion, and the tail portion to the memory in response to the write command.

* * * * *